US011417108B2

(12) United States Patent
Miyano et al.

(10) Patent No.: US 11,417,108 B2
(45) Date of Patent: Aug. 16, 2022

(54) TWO-WHEEL VEHICLE RIDING PERSON NUMBER DETERMINATION METHOD, TWO-WHEEL VEHICLE RIDING PERSON NUMBER DETERMINATION SYSTEM, TWO-WHEEL VEHICLE RIDING PERSON NUMBER DETERMINATION APPARATUS, AND PROGRAM

(71) Applicant: NEC Corporation, Tokyo (JP)

(72) Inventors: Hiroyoshi Miyano, Tokyo (JP); Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/399,646

(22) Filed: Apr. 30, 2019

(65) Prior Publication Data

US 2019/0325232 A1   Oct. 24, 2019

Related U.S. Application Data

(63) Continuation of application No. 15/037,882, filed as application No. PCT/JP2014/079824 on Nov. 11, 2014, now abandoned.

(30) Foreign Application Priority Data

Nov. 20, 2013   (JP) .................................. 2013-239597

(51) Int. Cl.
*G06V 20/54* (2022.01)
*G08G 1/017* (2006.01)
(Continued)

(52) U.S. Cl.
CPC ................ *G06V 20/54* (2022.01); *G06T 7/60* (2013.01); *G06V 10/44* (2022.01); *G06V 10/46* (2022.01);
(Continued)

(58) Field of Classification Search
CPC ........... G06K 9/00785; G06K 9/00335; G06K 9/00362; G06K 9/4604; G06K 9/48;
(Continued)

(56) References Cited

U.S. PATENT DOCUMENTS

2003/0053658 A1* 3/2003 Pavlidis ........... G08B 13/19608
382/103
2005/0105770 A1* 5/2005 Sumitomo ......... G06K 9/00362
382/103
(Continued)

FOREIGN PATENT DOCUMENTS

| JP | 64-37699 | 2/1989 |
| JP | 2010-211427 | 9/2010 |
| JP | 2013-232080 | 11/2013 |

OTHER PUBLICATIONS

Tangnoi et al., "A Motorcycle Safety Helmet Detection System using KNN Classifier", Mar. 2013, Proc. 2013 2nd ICT Int. Student Project Conf., p. 97-100. (Year: 2013).*

(Continued)

*Primary Examiner* — Vincent Rudolph
*Assistant Examiner* — Timothy Choi

(57) ABSTRACT

The present invention is a two-wheel vehicle riding person number determination system including an imaging means configured to image a two-wheel vehicle that is installed in a predetermined position and travels on a road, and a two-wheel vehicle riding person number determining means configured to process an image of the imaging means, extract a contour shape of an upper position of the two-wheel vehicle that travels on the road, detect humped shapes corresponding to heads of persons who ride on the two-wheel vehicle from the contour shape of the upper position of the two-wheel vehicle, and determine, on the basis of the humped shapes, whether or not the number of the persons who ride on the two-wheel vehicle is at least two persons or more.

22 Claims, 7 Drawing Sheets

(51) Int. Cl.
- G08G 1/04 (2006.01)
- G08G 1/015 (2006.01)
- G06V 10/44 (2022.01)
- G06V 10/46 (2022.01)
- G06V 40/10 (2022.01)
- G06T 7/60 (2017.01)
- G06V 10/42 (2022.01)
- G06V 40/20 (2022.01)

(52) U.S. Cl.
CPC ............. G06V 40/10 (2022.01); G08G 1/015 (2013.01); G08G 1/017 (2013.01); G08G 1/04 (2013.01); *G06T 2207/30242* (2013.01); *G06T 2207/30256* (2013.01); *G06V 10/42* (2022.01); *G06V 40/20* (2022.01); *G06V 2201/08* (2022.01)

(58) Field of Classification Search
CPC .. G06K 9/52; G06K 9/00369; G06K 2209/23; G06T 7/60; G06T 2207/30232; G06T 2207/30236; G06T 2207/30242; G06T 2207/30244; G06T 2207/30248; G06T 2207/30252; G06T 2207/30256; G08G 1/015; G08G 1/017; G08G 1/04
See application file for complete search history.

(56) References Cited

U.S. PATENT DOCUMENTS

| | | | | |
|---|---|---|---|---|
| 2009/0010493 A1* | 1/2009 | Gornick | ............. | G06K 9/00771 382/103 |
| 2009/0041297 A1* | 2/2009 | Zhang | ................... | G06V 10/46 382/103 |
| 2010/0322476 A1* | 12/2010 | Kanhere | .............. | G08G 1/0175 382/103 |
| 2012/0147188 A1* | 6/2012 | Yokochi | ................. | G06V 40/23 348/148 |
| 2014/0015981 A1* | 1/2014 | Dietl | ........................ | H04N 7/18 348/159 |
| 2016/0292516 A1* | 10/2016 | Miyano | ..................... | G06T 7/60 |

OTHER PUBLICATIONS

Messelodi et al., "Vision-based bicycle/motorcycle classification", Oct. 2007, Elsevier, Pattern Recognition Letters, vol. 28, is. 13, p. 1719-1726. (Year: 2007).*

Ku et al., "Visual Motorcycle Detection and Tracking Algorithms", Apr. 2008, WSEAS, Transactions on Electronics, iss. 4, vol. 5, p. 121-131 (Year: 2008).*

Sandhawalia et al., "Vehicle type classification from laser scanner profiles: a benchmark of feature descriptors", IEEE, Oct. 2013, Proceedings of the 16th International IEEE Annual Conference on Intelligent Transportation Systems, p. 517-522. (Year: 2013).*

International Search Report and Written Opinion dated Feb. 3, 2015, in corresponding PCT International Application.

Tangnoi et al., "A Motorcycle Safety Helmet Detection System using KNN Classifier", Mar. 2013, Proc. 2013 2nd ICT Int. Sutdent Project Conf., p. 97-100.

Heikkila et al., "A Real-Time System for Monitoring of Cyclists and Pedestrians", Jun. 1999, IEEE, Proceedings Second IEEE Workshop on Visual Surveillance, p. 1-8. (Year: 1999).

Office Action dated Oct. 5, 2020, by the United States Patent and Trademark Office in counterpart U.S. Appl. No. 15/037,882.

Sandhawalia, Harsimrat et al., "Vehicle Type Classification from Laser Scanner Profiles: a Benchmark of Feature Descriptors," Proceedings of the 16th International IEEE Annual Conference on Intelligent Transportation Systems (ITSC 2013), p. 517-522 (Oct. 2013).

* cited by examiner

RIDING STATE FRAME

VEHICLE BODY FRAME

SPECIFY BIKE FROM CIRCULAR CONTOUR AND SPECIFY VEHICLE BODY

RIDING STATE FRAME

VEHICLE BODY FRAME

ND PROGRAM

TWO-WHEEL VEHICLE RIDING PERSON NUMBER DETERMINATION METHOD, TWO-WHEEL VEHICLE RIDING PERSON NUMBER DETERMINATION SYSTEM, TWO-WHEEL VEHICLE RIDING PERSON NUMBER DETERMINATION APPARATUS, AND PROGRAM

CROSS-REFERENCE TO RELATED PATENT APPLICATIONS

This application is a continuation of U.S. patent application Ser. No. 15/037,882, filed May 19, 2016, which is a National Stage Entry of International Application No. PCT/JP2014/079824, filed Nov. 11, 2014, which claims priority from Japanese Patent Application No. 2013-239597, filed Nov. 20, 2013. The entire contents of the above-referenced applications are expressly incorporated herein by reference.

TECHNICAL FIELD

The present invention relates to a two-wheel vehicle riding person number determination method, a two-wheel vehicle riding person number determination system, a two-wheel vehicle riding person number determination apparatus, and a program.

BACKGROUND ART

Recently, from a standpoint of security, a technology for monitoring a mobile object such as an automobile that travels on a road is proposed. Further, the technology is a technology for determining and detecting whether a mobile object that travels on a road is any one of an automobile (four-wheel vehicle), a bike (two-wheel vehicle), a bicycle (two-wheel vehicle), and a pedestrian.

In particular, from a standpoint of safety and illegality, a two-wheel vehicle on which a plurality of persons ride, for example, a two-wheel vehicle on which two persons ride is expected to be detected.

To cope with the above, a technology for not only distinguishing an automobile (four-wheel vehicle), a bike (two-wheel vehicle), and a bicycle (two-wheel vehicle) in mobile objects, but also discriminating the number of persons who ride on the bike (two-wheel vehicle) and the bicycle (two-wheel vehicle) is proposed (for example, see Patent Literature 1).

In the invention of Patent Literature 1, an image processing means processes an image picked up by an imaging device that images a road and detects faces of persons who ride on a two-wheel vehicle that travels on the road. The image processing means determines in a bicycle whether or not the number of the detected faces is two, and further determines the number of persons who ride on the bicycle.

CITATION LIST

Patent Literature

Patent Literature 1: Japanese Laid-open Patent Publication No. 2010-211427

SUMMARY OF INVENTION

Technical Problem

However, there is a problem that in the invention disclosed in Patent Literature 1, faces of persons who ride on a two-wheel vehicle are detected, but it is difficult to detect them, and further it takes time to process the detection.

Further, a detection object may be absent in an image or a face may be imaged while partially overlapped with a face of another person up to the extent of recognition of the faces of the persons who ride on the two-wheel vehicle. At this time, the faces of all the persons who ride on the two-wheel vehicle cannot be recognized and the number of the persons who ride on the two-wheel vehicle cannot be determined correctly.

The present invention is made to solve the above problem. Therefore, the purpose of the present invention is to provide a two-wheel vehicle riding person number determination method, a two-wheel vehicle riding person number determination system, a two-wheel vehicle riding person number determination apparatus, and a program capable of determining with high accuracy whether or not the number of persons who ride on a two-wheel vehicle is at least two persons or more.

Solution to Problem

The present invention is directed to a two-wheel vehicle riding person number determination system including an imaging means configured to image a two-wheel vehicle that is installed in a predetermined position and travels on a road, and a two-wheel vehicle riding person number determining means configured to process an image of the imaging means, extract a contour shape of an upper position of the two-wheel vehicle that travels on the road, detect humped shapes corresponding to heads of persons who ride on the two-wheel vehicle from the contour shape of the upper position of the two-wheel vehicle, and determine, on the basis of the humped shapes, whether or not the number of the persons who ride on the two-wheel vehicle is at least two persons or more.

The present invention is directed to a two-wheel vehicle riding person number determination method including the steps of processing an image of an imaging device that images a road and extracting a contour shape in an upper position of a two-wheel vehicle that travels on the road, and detecting humped shapes corresponding to heads of persons who ride on the two-wheel vehicle from the contour shape in the upper position of the two-wheel vehicle and determining, on the basis of the humped shapes, whether or not the number of the persons who ride on the two-wheel vehicle is at least two persons or more.

The present invention is directed to a two-wheel vehicle riding person number determination apparatus including a two-wheel vehicle riding person number determining means configured to process an image of an imaging device that images a road, extract a contour shape in an upper position of a two-wheel vehicle that travels on the road, detect humped shapes corresponding to heads of persons who ride on the two-wheel vehicle from the contour shape in the upper position of the two-wheel vehicle, and determine, on the basis of the humped shapes, whether or not the number of the persons who ride on the two-wheel vehicle is at least two persons or more.

The present invention is directed to a program for causing a computer to execute a procedure for processing an image of an imaging device that images a road and extracting a contour shape in an upper position of a two-wheel vehicle that travels on the road, and a procedure for detecting humped shapes corresponding to heads of persons who ride on the two-wheel vehicle from the contour shape in the upper position of the two-wheel vehicle, and determining, on the basis of the humped shapes, whether or not the number of the persons who ride on the two-wheel vehicle is at least two persons or more.

Advantageous Effects of Invention

According to the present invention, on the basis of images of a two-wheel vehicle that travels on a road, it can be determined whether or not the number of persons who ride on the two-wheel vehicle is at least two persons or more.

DESCRIPTION OF EMBODIMENTS

Embodiments of the present invention will be described with reference to the accompanying drawings.

Figure 1:
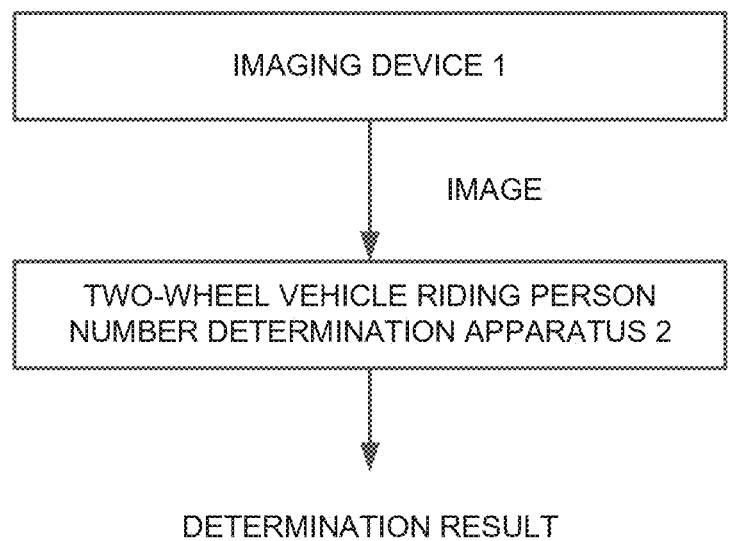
FIG. 1 is a block diagram illustrating a concept of the present invention.

First, a concept of the present invention will be described. FIG. 1 is a block diagram illustrating the concept of the present invention. In FIG. 1, a reference numeral 1 denotes an imaging device, and a reference numeral 2 denotes a two-wheel vehicle riding person number determination apparatus.

The imaging device 1 is installed in a predetermined position of a lateral side of a road on which a two-wheel vehicle travels, and images the two-wheel vehicle that travels on the road. In addition, the two-wheel vehicle travels is, for example, motor-cycle such as bike, a bicycle, etc.

The two-wheel vehicle riding person number determination apparatus 2 processes an image of the imaging device 1 and extracts a contour shape in an upper position of the two-wheel vehicle that travels on the road. From the contour shape in the upper position of the two-wheel vehicle, the two-wheel vehicle riding person number determination apparatus 2 detects humped shapes corresponding to heads of persons who ride on the two-wheel vehicle. Further, the two-wheel vehicle riding person number determination apparatus 2 determines, on the basis of the humped shapes, whether or not the number of persons who ride on the two-wheel vehicle is at least two persons or more.

In particular, the present invention is characterized in that it is noticed that a contour of the head of the person who rides on the two-wheel vehicle has a peculiar shape and it is determined whether or not the number of persons who ride on the two-wheel vehicle is at least two persons or more. For example, in the case where the number of persons who ride on the two-wheel vehicle is two, namely, a so-called two-seater, when a contour of the upper part of the two-wheel vehicle is extracted from the image, the contour shape has two continuous humps (mountain portions). When the above is put differently, it may safely be said that the number of the persons who ride on the two-wheel vehicle is determined, on the basis of the number of the humped shapes corresponding to the heads of the persons who ride on the two-wheel vehicle.

In the present invention, by using the above-described characteristics, it can be determined whether or not the number of the persons who ride on the two-wheel vehicle is at least two persons or more, without necessity to recognize a face of the person who rides on the two-wheel vehicle.

Next, operations of the two-wheel vehicle riding person number determination apparatus 2 will be described with reference to FIG. 2.

Figure 2:
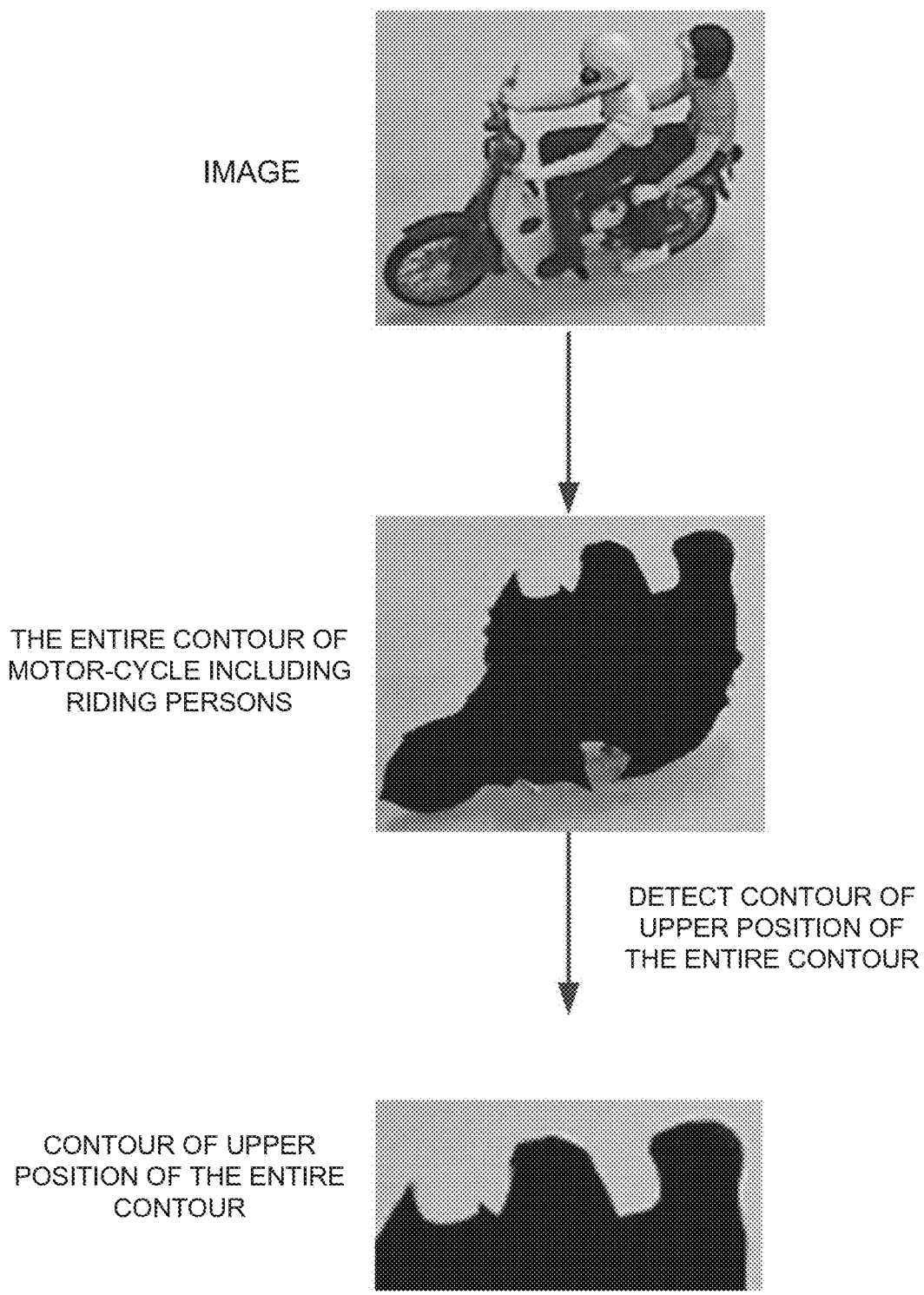
FIG. 2 illustrates the present invention.

First, when the image imaged by the imaging device 1 is illustrated in FIG. 2, the contour shape in the upper position of the two-wheel vehicle is extracted from the above image. As an extraction method, the entire contour of the image (the entire contour) in which a driver rides on the two-wheel vehicle is extracted, and then only the contour in the range in a predetermined upper position is taken out (the contour in the upper position) from the entire contour. Alternatively, from the entire image in which a driver rides on the two-wheel vehicle, a vehicle body unit of the two-wheel vehicle may be specified, and only the contour in the upper position may be extracted from the image in the predetermined range of the upper vehicle body unit.

Next, the humped shapes estimated to be the heads of the persons who ride on the two-wheel vehicle are estimated from the contour shape in the upper position. In the contour illustrated in FIG. 3, the humped shapes estimated to be the heads include two of a humped shape B and a humped shape C. As one of methods for detecting the humped shape B and the humped shape C, they are considered to be detected by the humped shapes themselves. The head of a person is a spherical body, and even if a helmet is worn, a contour of the hump is circular to some extent, and further, the contour has not a shape in which an edge of the hump is pointed like the hump A. When the humped shapes estimated to be the heads of the persons are previously learnt and a database of the humped shapes is made, the humped shapes estimated to be the heads can be specified from the contour shape in the upper position. In an example of FIG. 3, for example, since the number of the detected humps is two, it can be determined that the number of the persons who ride on the two-wheel vehicle is two.

Figure 3:
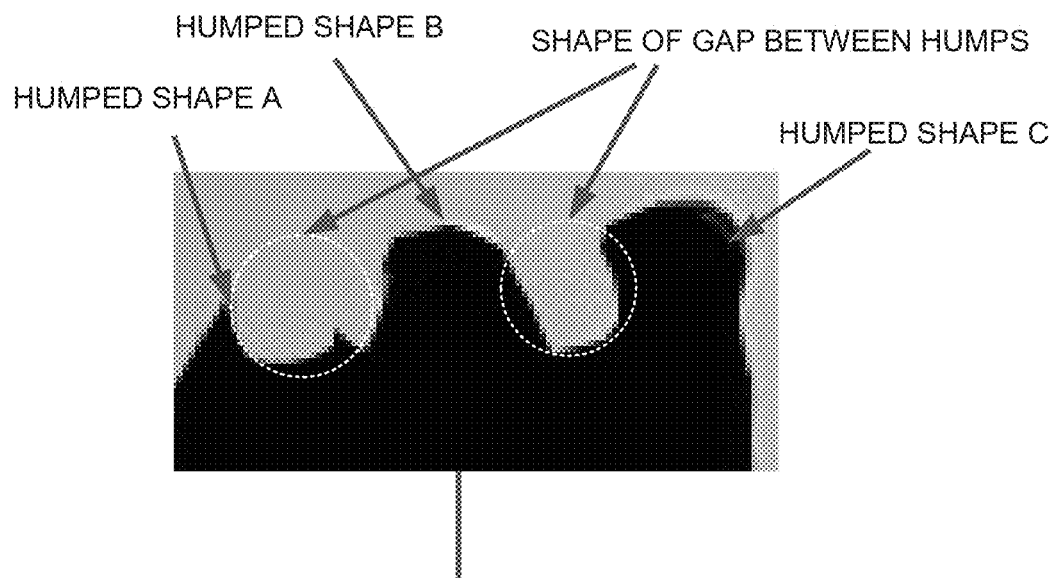
FIG. 3 illustrates the present invention.

Further, as illustrated in FIG. 3, the humped shapes corresponding to the heads of the persons can be specified from shapes of valley portions of the contour shape in the upper position. In the case where two persons ride on the two-wheel vehicle, for example, a peculiar valley portion formed by a line from a head and a back of a person who rides on a front seat of the two-wheel vehicle up to arms, a chest, and a head of a person who rides on a rear seat of the two-wheel vehicle is generated between the humps. Accordingly, when the peculiar portion of the valley portion is previously learnt and the database is made, the humped shape estimated to be the head can be specified on the basis of the contour shape in the upper position. Further, two methods described above are combined, and thereby accuracy of specifying the humped shape estimated to be the head can be improved more. Further, the humped shapes estimated to be the heads of the persons are detected and the number of the humped shapes is counted, thereby detecting the number of the persons who ride on the two-wheel vehicle.

As described above, in the case of a state in which two persons ride on the two-wheel vehicle, it may be determined that two persons ride on the two-wheel vehicle, on the basis of the peculiar contour in which the peculiar contour of two continuous humps is generated. When the peculiar shapes of continuous humps are previously learnt and the database is made, it can be determined whether or not the number of the persons who ride on the two-wheel vehicle is at least two persons or more, on the basis of the contour shape in the upper position.

In addition, the present method is not limited to a state in which two persons ride on the two-wheel vehicle, and also a state in which persons more than two persons ride on the two-wheel vehicle can be determined. For example, in the case where three humped shapes estimated to be heads of the above-described persons are detected, the number of the persons who ride on the two-wheel vehicle can be determined to be three. Further, the above-described method is merely one example, and is not limited thereto.

As described above, the humped shapes corresponding to the heads of the persons who ride on the two-wheel vehicle are detected on the basis of the contour shape in the upper position of the two-wheel vehicle. Further, it can be determined, on the basis of the humped shapes, whether or not the number of the persons who ride on the two-wheel vehicle is at least two persons or more.

Next, a specific embodiment of the present invention will be described.

Figure 4:
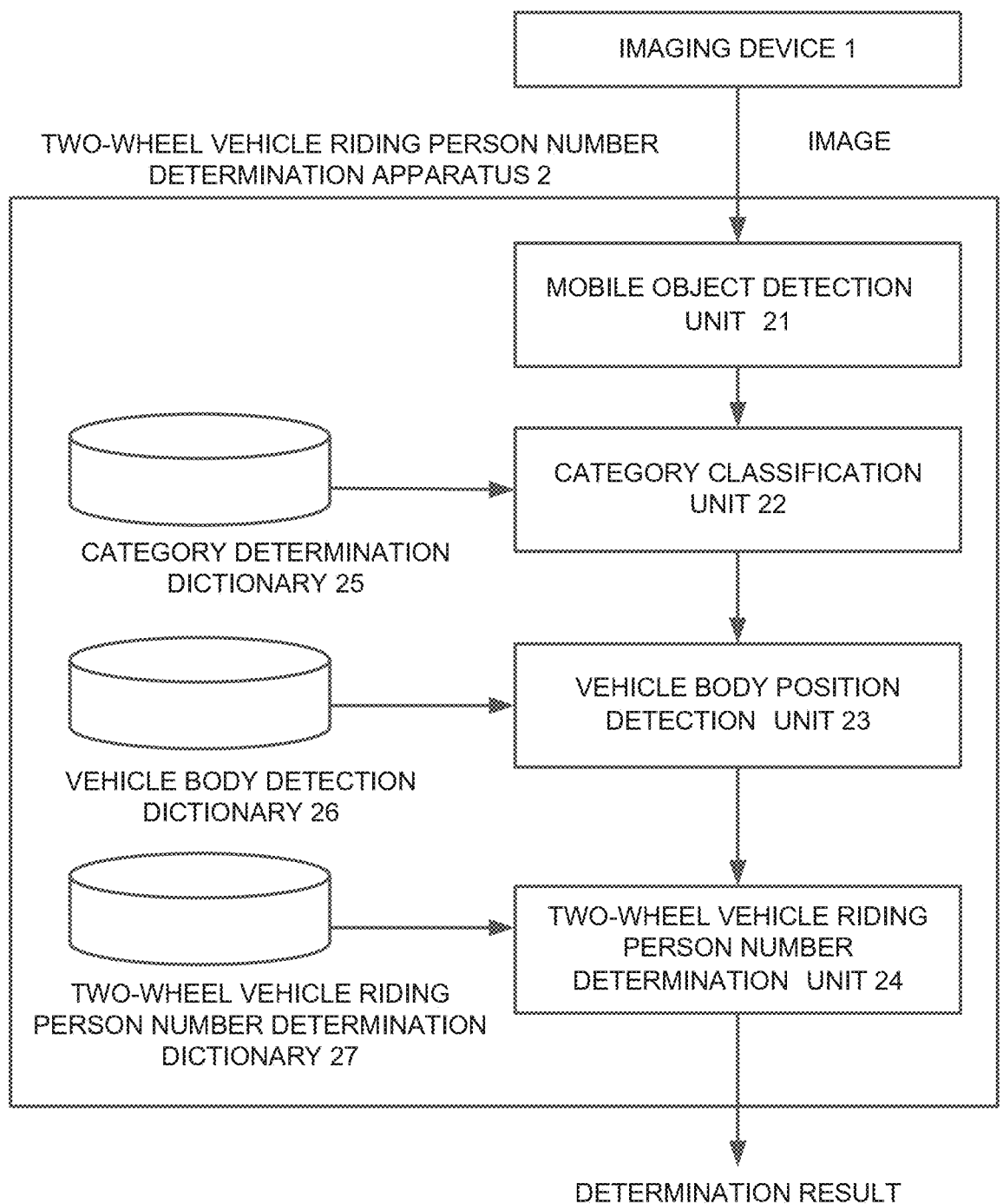
FIG. 4 is a block diagram illustrating a two-wheel vehicle riding person number determination system according to an embodiment of the present invention.

FIG. 4 is a block diagram illustrating a two-wheel vehicle riding person number determination system according to the embodiment of the present invention.

The two-wheel vehicle riding person number determination system according to the embodiment of the present invention includes the imaging device 1 and the two-wheel vehicle riding person number determination apparatus 2.

The imaging device 1 images a two-wheel vehicle that travels on a road, and is installed in a position in which an image in which the humped shapes in the upper position of the above-described two-wheel vehicle are easily detected can be imaged.

Figure 5:
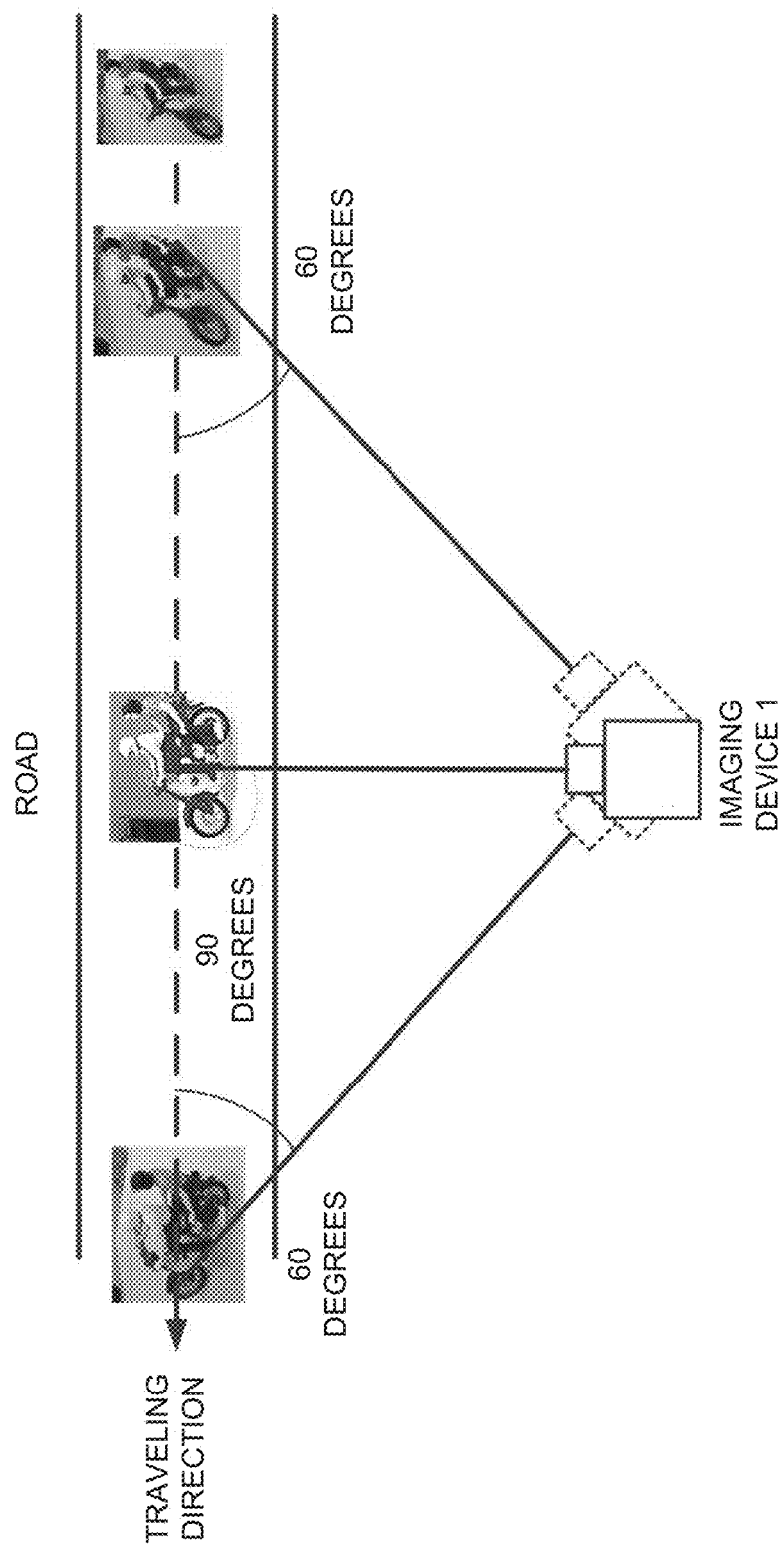
FIG. 5 illustrates an installation location of an imaging device 1.
Figure 6:
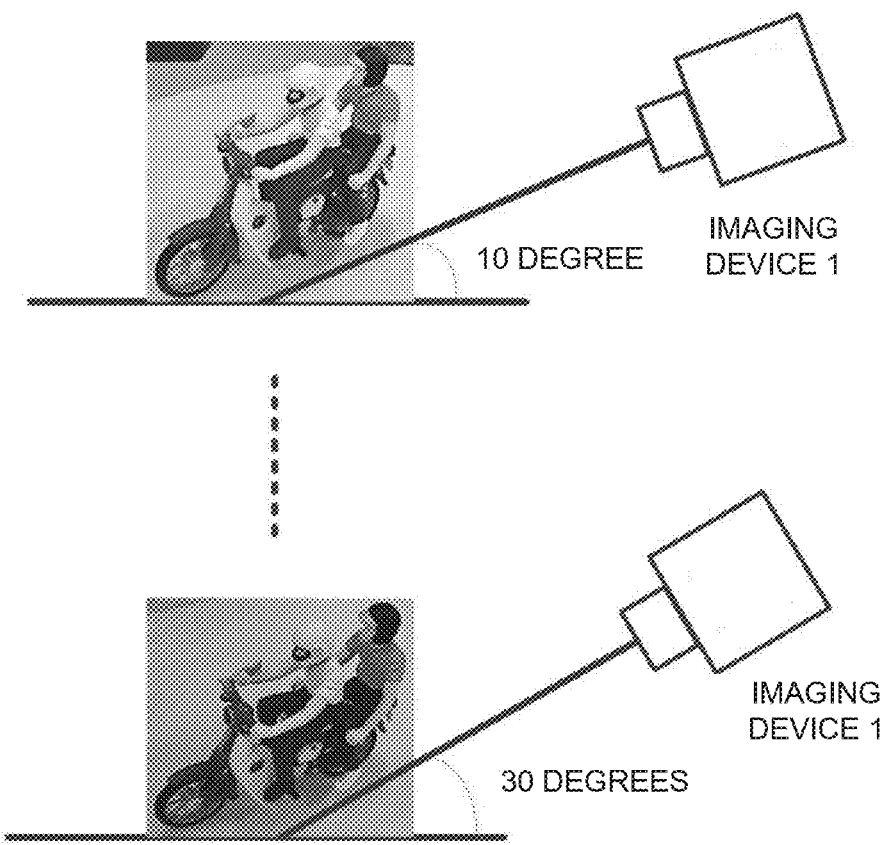
FIG. 6 illustrates an installation location of the imaging device 1.

Specifically, as illustrated in FIG. 5, the imaging device 1 is installed in a position in the range in which an angle formed by a traveling direction in the road and a photographic direction is from 60 to 90 degrees. When the above is put differently, a camera is installed so that the two-wheel vehicle is imaged in the range of 30 degrees each forward or backward from the lateral side of the two-wheel vehicle. Further, as illustrated in FIG. 6, the imaging device 1 is installed so that an angle formed by the photographic direction and a road surface, namely, a depression angle of the photographic direction to the road surface is from 10 to 30 degrees. By installing the camera as described above, the two-wheel vehicle can be imaged so that the humped shapes of the heads according to the number of the persons who ride on the two-wheel vehicle are recognized.

The depression angle of the photographic direction to the road surface is not necessarily in the range of 10 to 30 degrees, and may be, for example, in the range of 0 to 30 degrees. Further, the depression angle of the photographic direction to the road surface may be in the range of 10 to 20 degrees, 20 to 30 degrees, or 0 to 45 degrees.

The two-wheel vehicle riding person number determination apparatus 2 includes a mobile object detection unit 21, a category classification unit 22, a vehicle body position detection unit 23, a two-wheel vehicle riding person number determination unit 24, a category determination dictionary 25, a vehicle body detection dictionary 26, and a two-wheel vehicle riding person number determination dictionary 27.

The mobile object detection unit 21 detects a mobile object that moves in an image from the imaging device 1. In a method for detecting the mobile object, various types of methods are conventionally proposed and an appropriate method may be selected.

The category classification unit 22 specifies the two-wheel vehicle (bike) from among the mobile objects by using the category determination dictionary 25, and supplies to the vehicle body position detection unit 23 the entire image of the two-wheel vehicle (bike) that moves. A database of information for specifying the two-wheel vehicle (bike) is made and registered in the category determination dictionary 25.

Specifically, the category classification unit 22 receives detection of the mobile objects from the mobile object detection unit 21, and classifies a category of the mobile objects. In the classification of the category of the mobile objects, a size of a search range for discriminating the category of the mobile objects is previously determined and a probability that the mobile object is any mobile object other than the two-wheel vehicle is calculated on the basis of a characteristic amount in the search range. On the basis of the above results, any mobile object other than the two-wheel vehicle is excluded. In the predetermined search range, for example, characteristics that two circles are aligned approximately linearly can be used as characteristics for calculating the probability that the mobile object is any mobile object other than the two-wheel vehicle. Further, characteristics of positions of headlights or the number thereof can be used as characteristics for calculating the probability that the mobile object is any mobile object other than the two-wheel vehicle (bike). A characteristic portion of the image as described above is previously learnt and a database of the above data is made as the category determination dictionary 25. Further, by using the category determination dictionary 25, the category classification unit 22 determines the probability that the detected mobile object is any mobile object other than the two-wheel vehicle. In the case where the probability is more than a predetermined threshold, the category classification unit 22 prevents the entire image of the mobile object from being supplied to the vehicle body position detection unit 23. On the other hand, in the case where the probability is not more than the predetermined threshold, the category classification unit 22 supplies the entire image of the detected mobile object to the vehicle body position detection unit 23. By using the category determination dictionary 25, for example, the category classification unit 22 prevents the entire image of the detected mobile object that is determined to be any mobile object other than the two-wheel vehicle with the probability of 90% (=a predetermined threshold) from being supplied to the vehicle body position detection unit 23. On the other hand, since there is also the possibility that the mobile object that is determined to be any mobile object other than the two-wheel vehicle with the possibility of 90% or less, for example, 85% is the two-wheel vehicle, the category classification unit 22 supplies the entire image of the mobile object to the vehicle body position detection unit 23 to perform a detailed verification.

Figure 7:
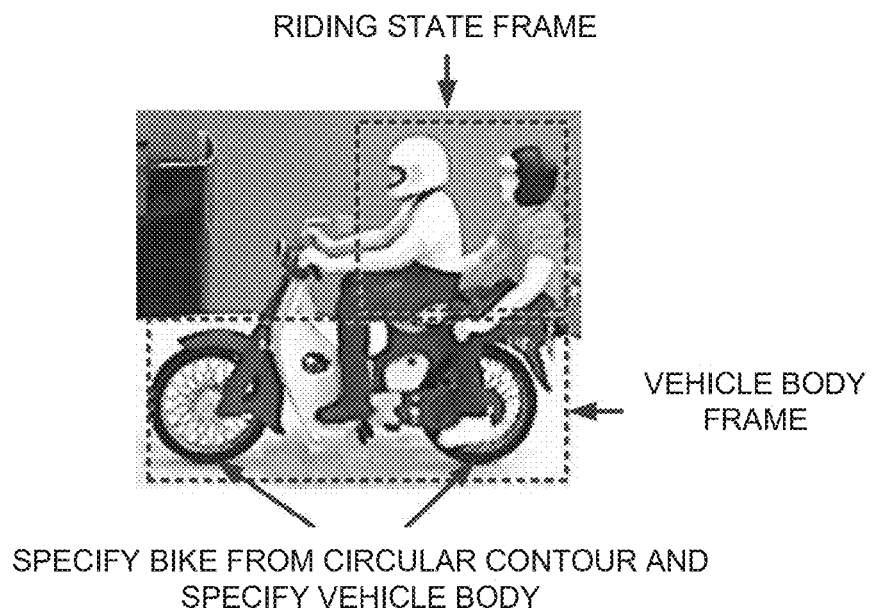
FIG. 7 illustrates a vehicle body frame and a riding state frame.
Figure 8:
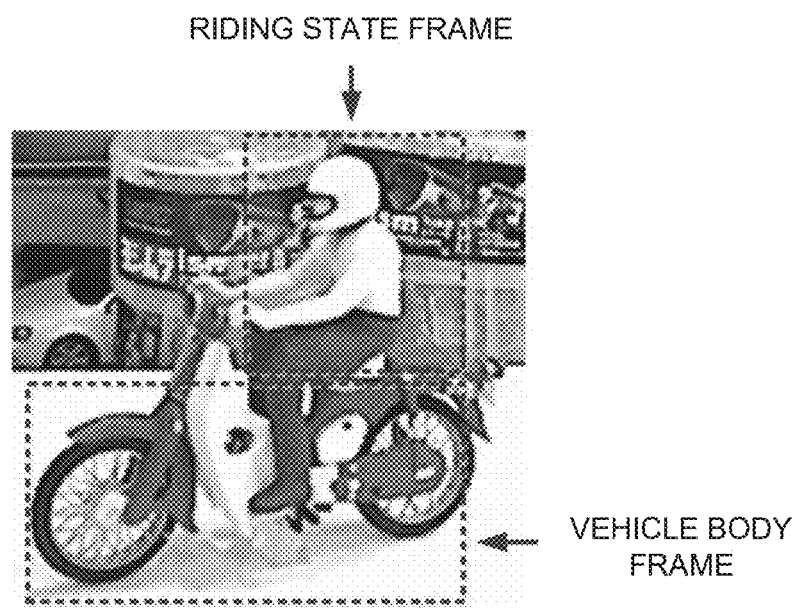
FIG. 8 illustrates the vehicle body frame and the riding state frame.

On the basis of the entire image of the mobile object produced from the category classification unit 22, the vehicle body position detection unit 23 specifies a range according to the vehicle body unit of the two-wheel vehicle by using the vehicle body detection dictionary 26. For example, the vehicle body position detection unit 23 can specify this range on the basis of a distance between wheels of the two-wheel vehicle. In an example (an image imaged from the lateral side) of the entire image of the two-wheel vehicle (bike) illustrated in FIG. 7, for example, a range in which a length between a front end on the lateral side of a front wheel and a rear end on the lateral side of a rear wheel of the two-wheel vehicle is set as a horizontal width and a length in a longitudinal direction of the wheel is set as a vertical width is specified as a range (a vehicle body frame) of the vehicle body unit. Further, in an example (an image imaged from the obliquely front side) of the entire image of the two-wheel vehicle (bike) illustrated in FIG. 8, a range in which a length between a front end on the lateral side of the front wheel and a rear end on the lateral side of the rear wheel of the two-wheel vehicle is set as a horizontal width, and that is slightly larger than a width between a front end on the upper side and a front end on the installation side of the front wheel and the rear wheel of the two-wheel vehicle is specified as a range (a vehicle body frame) of the vehicle body unit. A wheel shape and a distance between wheels of the two-wheel vehicle that is required to be specified are previously learnt and a database of the above data is made as the vehicle body detection dictionary 26.

In addition, only images of the two-wheel vehicle are not necessarily produced from the category classification unit 22. (For example, in the case where a threshold for determining whether or not the detected mobile object is the two-wheel vehicle is 90%, an image of the mobile object that is determined not to be the two-wheel vehicle with the probability of 85% is produced). Therefore, the vehicle body position detection unit 23 cannot specify the vehicle body unit of the two-wheel vehicle by using the vehicle body detection dictionary 26 in some cases. In this case, on the premise that the mobile object is any mobile object other than the two-wheel vehicle, the mobile object is excluded from objects of processing.

By using the two-wheel vehicle riding person number determination dictionary 27, the two-wheel vehicle riding person number determination unit 24 determines whether or not the number of the persons who ride on the two-wheel vehicle is at least two persons or more. Specifically, the two-wheel vehicle riding person number determination unit 24 specifies a riding state frame in an upper position of the vehicle body frame specified by the vehicle body position detection unit 23. This riding state frame is a frame in which a width in the horizontal direction is set to a length from the vicinity of a driving seat of the vehicle body up to a tail of the vehicle body and a height in the vertical direction is set to the same height as that of the vehicle body frame. For simplicity, a frame obtained by reducing a horizontal width of the vehicle body frame to half can be set as the riding state frame. A position and a size of the riding state frame are previously learnt and registered in the two-wheel vehicle riding person number determination dictionary 27.

A plurality of images about the bike on which a person rides and the bike on which two persons ride may be previously acquired and a relative position and a size of the riding state frame to the vehicle body frame may be statistically determined.

Continuously, the two-wheel vehicle riding person number determination unit 24 extracts contours of riding states from the images in the riding state frame. In addition, in the extraction of the contour shapes, the two-wheel vehicle riding person number determination unit 24 replaces a background region by another pattern among a foreground region and a background region separated by a background difference, thereby extracting the contour shapes easily.

The two-wheel vehicle riding person number determination unit 24 detects humped shapes estimated to be the heads of the persons who ride on the two-wheel vehicle on the basis of the extracted contours. As a detection method, the humped shape having characteristics of the head of the person such as an attribute that the head of the person is a spherical body and even if a helmet is worn, a contour of the hump is circular to some extent, is previously learnt and registered in the two-wheel vehicle riding person number determination dictionary 27. Further, the humped shapes corresponding to the heads of the persons can be specified from shapes of valley portions of the extracted contour shape. In this case, characteristics of shapes of the valley portions between the humps formed by the heads of the persons are learnt and registered in the two-wheel vehicle riding person number determination dictionary 27. Further, when a plurality of persons ride on the two-wheel vehicle, a concatenation of peculiar humped shapes is learnt and registered in the two-wheel vehicle riding person number determination dictionary 27. By using the two-wheel vehicle riding person number determination dictionary 27, the two-wheel vehicle riding person number determination unit 24 detects the humped shapes corresponding to the heads of the persons in the riding state frame. Further, the two-wheel vehicle riding person number determination unit 24 determines, on the basis of the humped shapes, whether or not the number of the persons who ride on the two-wheel vehicle is at least two persons or more. In addition, when the number of the persons who ride on the two-wheel vehicle is at least two persons or more, results thereof may be output or warning may be given by an alarm.

Specifically, as described above by using FIG. 3, the humped shapes estimated to be the heads of the persons who ride on the two-wheel vehicle are estimated on the basis of the shapes of the contour extracted from the image in the riding state frame. In the contour illustrated in FIG. 3, the humped shapes estimated to be the heads include two of a humped shape B and a humped shape C. As one of methods for detecting the humped shape B and the humped shape C, the humped shapes are considered to be detected by the humped shapes themselves. The head of a person is a spherical body, and even if a helmet is worn, a contour of the hump is circular to some extent, and further, the contour has not a shape in which an edge of the hump is pointed like the hump A. The above characteristics are previously registered in the two-wheel vehicle riding person number determination dictionary 27. By using the two-wheel vehicle riding person number determination dictionary 27, the two-wheel vehicle riding person number determination unit 24 can specify the humped shapes estimated to be the heads on the basis of the extracted contour shape. In the example of FIG. 3, for example, since the number of the detected humps is two, it can be determined that the number of the persons who ride on the two-wheel vehicle is two.

Further, as illustrated in FIG. 3, the humped shapes corresponding to the heads of the persons can be specified from shapes of valley portions of the contour shape extracted from the image in the riding state frame. In the case where two persons ride on the two-wheel vehicle, for example, a peculiar valley portion formed by a line from a head and a back of a person who rides on a front seat of the two-wheel vehicle up to arms, a chest, and a head of a person who rides on a rear seat of the two-wheel vehicle is generated between the humps. Accordingly, when the peculiar shape of the valley portion is previously learnt and registered in the two-wheel vehicle riding person number determination dictionary 27, the humped shapes estimated to be the heads can be specified on the basis of the contour shape. Further, two methods described above are combined, and thereby accuracy of specifying the humped shapes estimated to be the heads can be improved more.

Further, the two-wheel vehicle riding person number determination unit 24 detects the humped shapes estimated to be the heads of the persons, and counts the number of the humped shapes, thereby detecting the number of the persons who ride on the two-wheel vehicle. For example, when the number of the detected humps is three, the number of the persons who ride on the two-wheel vehicle can be determined to be three.

Even if the category classification unit 22 or the vehicle body position detection unit 23 determines by mistake that the detected mobile object is the two-wheel vehicle, in the case where the mobile object is any mobile object other than the two-wheel vehicle, the humped shapes estimated to be the heads of the persons are not detected from the image. Therefore, a final result of a determination whether or not the number of the persons who ride on the two-wheel vehicle is at least two persons or more is not influenced.

According to the present embodiment configured as described above, it can be determined whether or not the number of the persons who ride on the two-wheel vehicle is two persons or more, without recognizing faces of the persons who ride on the two-wheel vehicle.

Further, the number of the humped shapes having characteristics of the heads of the persons is counted, and thereby the number of the persons who ride on the two-wheel vehicle can be specifically detected. For example, when the number of the detected humps is three, the number of the persons who ride on the two-wheel vehicle can be determined to be three.

In the above-described embodiment, on the basis of the humped shapes corresponding to the heads of the persons who ride on the two-wheel vehicle, an embodiment for determining whether or not a plurality of persons ride on the two-wheel vehicle is described; however, the present invention is not limited to the above embodiment. For example, on the basis of not only the humped shapes but also the entire shape (the entire silhouette) of the two-wheel vehicle on which persons ride, it may be determined whether or not the number of the persons who ride on the two-wheel vehicle is at least two persons or more.

Further, the system has a reporting device. The reporting device has a display unit that displays the image of the imaging device 1, and reports determination results of the Two-wheel vehicle riding person number determination apparatus 2 to a monitor.

The display unit is displayed the characteristics of the rider (for example, a driver) may be displayed to be easily understood (for example, enlarged). Examples of the characteristics of the rider (for example, the driver) include a face, clothes, a motor-cycle (a color, a type of bicycles, conversion, etc.), and the like. By using a technology of facial recognition or object recognition, the above characteristics are recognized from the image, the recognized portion is segmented from the image, and the segmented image is largely displayed separately from the determination results of the Two-wheel vehicle riding person number determination apparatus 2 (for example, a face of the driver is largely displayed). Through the above display, the characteristics of the rider (for example, the driver) can be grasped.

Further, in combination with a person collation system or an object collation system, the above-described recognized characteristics (for example, a face, clothes, a color of bicycles, a type of bicycles, conversion, etc.) may be collated with information about the person collation system or information about the object collation system, and collation results may be displayed. Examples of the collation results include information about criminal records, a maker of clothes, a type of bicycles/conversion contents, and the like. Through the above configuration, the system can be also used for prevention or exposure of criminals.

In the above-described embodiment, the two-wheel vehicle riding person number determination apparatus 2 is configured by hardware, and can be configured also by programs for making an information processing device execute the above-described operations. In this case, a processor that is operated by programs stored in a program memory implements functions and/or operations similar to those in the embodiments described above. Moreover, only part of functions of the embodiments described above may be implemented by a computer program.

Further, in the above-described embodiment, a determination object is described as the two-wheel vehicle. When the head of the person can be detected, the determination object is not limited to the two-wheel vehicle. Of course, the present invention is applicable also to a one-wheel vehicle, a three-wheel vehicle, and others.

Moreover, part or all of the preceding embodiments may be described as in the following Supplementary Notes, although not limited thereto.

[Supplementary Note 1] A two-wheel vehicle riding person number determination system comprising:

an imaging means configured to image a two-wheel vehicle that is installed in a predetermined position and travels on a road; and a two-wheel vehicle riding person number determining means configured to process an image of the imaging means, extract a contour shape of an upper position of the two-wheel vehicle that travels on the road, detect humped shapes corresponding to heads of persons who ride on the two-wheel vehicle from the contour shape of the upper position of the two-wheel vehicle, and determine, on a basis of the humped shapes, whether or not number of the persons who ride on the two-wheel vehicle is at least two persons or more.

[Supplementary Note 2] The two-wheel vehicle riding person number determination system according to Supplementary Note 1, wherein from the contour shape of the upper position of the two-wheel vehicle, the two-wheel vehicle riding person number determining means determines whether or not the number of persons who ride on the two-wheel vehicle is at least two persons or more, on the basis of the number of the humped shapes corresponding to the heads of the persons who ride on the two-wheel vehicle.

[Supplementary Note 3] The two-wheel vehicle riding person number determination system according to Supplementary Note 1 or 2, wherein from the contour shape of the upper position of the two-wheel vehicle, the two-wheel vehicle riding person number determining means determines the number of the persons who ride on the two-wheel vehicle, on the basis of the number of the humped shapes corresponding to the heads of the persons who ride on the two-wheel vehicle.

[Supplementary Note 4] The two-wheel vehicle riding person number determination system according to any one of Supplementary Notes 1 to 3, wherein the two-wheel vehicle riding person number determining means detects the humped shapes corresponding to the heads of the persons from shapes of valley portions of the contour shape in the upper position.

[Supplementary Note 5] The two-wheel vehicle riding person number determination system according to any one of Supplementary Notes 1 to 4, wherein when it is determined that the number of the persons who ride on the two-wheel vehicle is at least two persons or more, the two-wheel vehicle riding person number determining means reports results thereof.

[Supplementary Note 6] The two-wheel vehicle riding person number determination system according to any one of Supplementary Notes 1 to 5, wherein the two-wheel vehicle riding person number determining means specifies a vehicle body of the two-wheel vehicle from the image, and extracts the contour shape in the upper position from a region in which a horizontal width is set to a distance from vicinity of a driving seat of the vehicle body to a tail of the vehicle body and a vertical width is set to same height as that of the vehicle body, among upper images of the vehicle body.

[Supplementary Note 7] The two-wheel vehicle riding person number determination system according to any one of Supplementary Notes 1 to 6, wherein the imaging means is installed in a position in a range in which an angle formed by a traveling direction in the road and a photographic direction is from 60 to 90 degrees.

[Supplementary Note 8] The two-wheel vehicle riding person number determination system according to any one of Supplementary Notes 1 to 7, wherein the image is an image imaged in a range in which a depression angle in a photographic direction to a road surface is from 10 to 30 degrees.

[Supplementary Note 9] A two-wheel vehicle riding person number determination method, comprising:

processing an image of an imaging device that images a road and extracting a contour shape in an upper position of a two-wheel vehicle that travels on the road, and detecting humped shapes corresponding to heads of persons who ride on the two-wheel vehicle from the contour shape in the upper position of the two-wheel vehicle and determining, on a basis of the humped shapes, whether or not number of the persons who ride on the two-wheel vehicle is at least two persons or more.

[Supplementary Note 10] The two-wheel vehicle riding person number determination method according to Supplementary Note 9, wherein from the contour shape in the upper position of the two-wheel vehicle, it is determined whether or not the number of the persons who ride on the two-wheel vehicle is at least two persons or more, on the basis of the number of the humped shapes corresponding to the heads of the persons who ride on the two-wheel vehicle.

[Supplementary Note 11] The two-wheel vehicle riding person number determination method according to Supplementary Note 9 or 10, wherein from the contour shape in the upper position of the two-wheel vehicle, the number of the persons who ride on the two-wheel vehicle is determined on the basis of the number of the humped shapes corresponding to the heads of the persons who ride on the two-wheel vehicle.

[Supplementary Note 12] The two-wheel vehicle riding person number determination method according to any one of Supplementary Notes 9 to 11, wherein from shapes of valley portions of the contour shape in the upper position, the humped shapes corresponding to the heads of the persons are detected.

[Supplementary Note 13] The two-wheel vehicle riding person number determination method according to any one of Supplementary Notes 9 to 12, wherein when it is determined that the number of the persons who ride on the two-wheel vehicle is at least two persons or more, results thereof are reported.

[Supplementary Note 14] The two-wheel vehicle riding person number determination method according to any one of Supplementary Notes 9 to 13, wherein the contour shape in the upper position is a contour shape in which a vehicle body of the two-wheel vehicle is specified from the image, and that is extracted from a region in which a horizontal width is set to a distance from vicinity of a driving seat of the vehicle body to a tail of the vehicle body and a vertical width is set to same height as that of the vehicle body among upper images of the vehicle body.

[Supplementary Note 15] The two-wheel vehicle riding person number determination method according to any one of Supplementary Notes 9 to 14, wherein the image is an image imaged in a range in which an angle formed by a traveling direction in the road and a photographic direction is from 60 to 90 degrees.

[Supplementary Note 16] The two-wheel vehicle riding person number determination method according to any one of Supplementary Notes 9 to 15, wherein the image is an image imaged in a range in which a depression angle in a photographic direction to a road surface is from 10 to 30 degrees.

[Supplementary Note 17] A two-wheel vehicle riding person number determination apparatus, comprising:

a two-wheel vehicle riding person number determining means configured to process an image of an imaging device that images a road, extract a contour shape in an upper position of a two-wheel vehicle that travels on the road, detect humped shapes corresponding to heads of persons who ride on the two-wheel vehicle from the contour shape in the upper position of the two-wheel vehicle, and determine, on a basis of the humped shapes, whether or not number of the persons who ride on the two-wheel vehicle is at least two persons or more.

[Supplementary Note 18] A program for causing a computer to execute:

a procedure for processing an image of an imaging device that images a road and extracting a contour shape in an upper position of a two-wheel vehicle that travels on the road, and a procedure for detecting humped shapes corresponding to heads of persons who ride on the two-wheel vehicle from the contour shape in the upper position of the two-wheel vehicle, and determining, on a basis of the humped shapes, whether or not number of the persons who ride on the two-wheel vehicle is at least two persons or more.

Each embodiment as described above is a mere preferable embodiment of the present invention and thus the present invention will not be limited only to the embodiment. It is possible to carry out the present invention with various changes and modifications without departing from the spirit and scope of the invention.

The present application claims priority based on Japanese Patent Application No. 2013-239597 filed on Nov. 20, 2013, disclosure of which is incorporated herein in its entirety.

REFERENCE SIGNS LIST

1 Imaging device
2 Two-wheel vehicle riding person number determination apparatus
21 Mobile object detection unit 22 Category classification unit
23 Vehicle body position detection unit
24 Two-wheel vehicle riding person number determination unit
25 Category determination dictionary
26 Vehicle body detection dictionary
27 Two-wheel vehicle riding person number determination dictionary

The invention claimed is:

1. A two-wheel vehicle riding person number determination system comprising:
an imaging device imaging a two-wheel vehicle that travels on a road;
at least one memory storing instructions;
a database in which shape of a line, the line indicating an upper portion of a region representing a state formed by at least two persons previously riding the two-wheel vehicle, has been learned, the shape including at least two humped shapes and at least two valley shapes; and
at least one processor configured to execute the instructions to:
process an image obtained by the imaging device;
extract a whole contour shape of a target region from the image, the target region indicating the two-wheel vehicle and at least one person currently riding the two-wheel vehicle;
extract an upper portion of the whole contour shape; and
determine, on a basis of the upper portion of the whole contour shape, a number of persons currently riding the two-wheel vehicle by determining the state formed by the at least two persons previously riding the two-wheel vehicle using the database,
wherein the imaging device is installed to obtain the image in a range in which: a first angle formed by a traveling direction in the road and a photographic direction is limited to a range between 60 and 90 degrees; and a depression angle in the photographic direction to a road surface is between 10 and 30 degrees, the first angle and the depression angle causing the whole contour shape extracted by the at least one processor to include one or more humped shapes corresponding to the at least one person currently riding the two-wheel vehicle.

2. The two-wheel vehicle riding person number determination system according to claim 1, wherein the at least one processor is configured to execute the instructions to:
specify a vehicle body unit of the two-wheel vehicle from the image by using a vehicle body detection dictionary; and
specify a riding state frame in an upper portion of the vehicle body unit.

3. The two-wheel vehicle riding person number determination system according to claim 2, wherein the at least one processor is configured to execute the instructions to:
specify a range of the vehicle body unit, the range in which a length between a front end on a lateral side of a front wheel and a rear end on a lateral side of a rear wheel of the two-wheel vehicle is set as a horizontal width and a length in a longitudinal direction of the front or rear wheel is set as a vertical height, or the range in which a length that is larger than a width between the front end on an upper side and the rear wheel of the two-wheel vehicle is set as the horizontal width.

4. The two-wheel vehicle riding person number determination system according to claim 2, wherein
a head of each of the at least one person currently riding the two-wheel vehicle is specified from a shape of a contour of a valley portion in the upper portion of the vehicle body unit.

5. The two-wheel vehicle riding person number determination system according to claim 4, wherein the at least one person currently riding the two-wheel vehicle comprises a first person and a second person, and
the valley portion is formed by a line from the head and a back of the person of the at least one person currently riding on a front seat of the two-wheel vehicle up to arms, a chest, and the head of the second person currently riding on a rear seat of the two-wheel vehicle.

6. The two-wheel vehicle riding person number determination system according to claim 1, wherein the at least two persons previously riding the two-wheel vehicle includes three persons, the at least two humped shapes include three humped shapes corresponding to heads of the three persons, the shape stored in the database includes a contour of the three humped shapes,
the at least one processor is configured to execute the instructions to:
determine the number of persons currently riding the two-wheel vehicle is three using the database.

7. The two-wheel vehicle riding person number determination system according to claim 1, wherein
specify a region for a vehicle body unit of the two-wheel vehicle from the image; and
specify the upper portion based on the region for vehicle body unit the target region from the image.

8. A two-wheel vehicle riding person number determination method comprising:
processing an image obtained by an imaging device, the image representing a two-wheel vehicle that travels on a road;
extracting a whole contour shape of a target region from the image, the target region indicating the two-wheel vehicle and at least one person currently riding the two-wheel vehicle;
extracting an upper portion of the whole contour shape; and
determining, on a basis of the upper portion of the whole contour shape, a number of persons currently riding on the two-wheel vehicle by determining a state formed by at least two persons previously riding the two-wheel vehicle using a database in which shape of a line, the line indicating an upper portion of a region representing a state formed by the at least two persons previously riding the two-wheel vehicle, has been learned, the shape including at least two humped shapes and at least two valley shapes, wherein
the image is obtained in a range in which: a first angle formed by a traveling direction in the road and a photographic direction is limited to a range between 60 and 90 degrees; and a depression angle in the photographic direction to a road surface is between 10 and 30 degrees, wherein the first angle and depression angle causes the extracted contour shape to include one or more humped shapes corresponding to the at least one person currently riding the two-wheel vehicle.

9. A non-transitory computer readable recording medium storing a computer program, the computer program causing a computer to perform:

processing an image obtained by an imaging device, the image representing a two-wheel vehicle that travels on a road;

extracting a whole contour shape of a target region from the image, the target region indicating the two-wheel vehicle and at least one person currently riding the two-wheel vehicle;

extracting an upper portion of the whole contour shape; and determining, on a basis of the upper portion of the whole contour shape, a number of persons currently riding on the two-wheel vehicle by determining a state formed by at least two persons previously riding the two-wheel vehicle using a database in which shape of a line, the line indicating an upper portion of a region representing a state formed by the at least two persons previously riding the two-wheel vehicle, has been learned, the shape including at least two humped shapes and at least two valley shapes, wherein the image is obtained in a range in which: a first angle formed by a traveling direction in the road and a photographic direction is limited to a range between 60 and 90 degrees; and a depression angle in the photographic direction to a road surface is between 10 and 30 degrees, wherein the first angle and depression angle causes the extracted contour shape to include one or more humped shapes corresponding to the at least one person currently riding the two-wheel vehicle.

10. The two-wheel vehicle riding person number determination method according to claim 9, further comprising:

specifying a range of the vehicle body unit, the range in which a length between a front end on a lateral side of a front wheel and a rear end on a lateral side of a rear wheel of the two-wheel vehicle is set as a horizontal width and a length in a longitudinal direction of the front or rear wheel is set as a vertical height, or the range in which a length that is larger than a width between the front end on an upper side and the rear wheel of the two-wheel vehicle is set as the horizontal width.

11. The two-wheel vehicle riding person number determination method according to claim 9, wherein a head of each of the at least one person currently riding the two-wheel vehicle is specified from a shape of a contour of a valley portion in the upper portion of the vehicle body unit.

12. The two-wheel vehicle riding person number determination method according to claim 11, wherein the at least one person currently riding the two-wheel vehicle comprises a first person and a second person, and the valley portion is formed by a line from the head and a back of the person of the at least one person currently riding on a front seat of the two-wheel vehicle up to arms, a chest, and the head of the second person currently riding on a rear seat of the two-wheel vehicle.

13. The two-wheel vehicle riding person number determination method according to claim 8, wherein the at least two persons previously riding the two-wheel vehicle includes three persons, the at least two humped shapes include three humped shapes corresponding to heads of the three persons, the shape stored in the database includes a contour of the three humped shapes, the two-wheel vehicle riding person number determination method further comprising:

determining the number of persons who ride on the two-wheel vehicle is three using the database.

14. The two-wheel vehicle riding person number determination method according to claim 8, further comprising:

specifying a region for a vehicle body unit of the two-wheel vehicle from the image; and specifying the upper portion based on the region for vehicle body unit the target region from the image.

15. A non-transitory computer readable recording medium storing a computer program, the computer program causing a computer to perform:

processing an image obtained by an imaging device, the image representing a two-wheel vehicle that travels on a road;

extracting a whole contour shape of a target region from the image, the target region indicating the two-wheel vehicle and at least one person currently riding the two-wheel vehicle;

extracting an upper portion of the whole contour shape; and determining, on a basis of the upper portion of the two-wheel vehicle, a number of persons currently riding on the two-wheel vehicle by determining a state formed by at least two persons previously riding the two-wheel vehicle using a database in which shape of a line, the line indicating an upper portion of a region representing a state formed by the at least two persons previously riding the two-wheel vehicle, has been learned, the shape including at least two humped shapes and at least two valley shapes, wherein the image is obtained in a range in which: a first angle formed by a traveling direction in the road and a photographic direction is limited to a range between 60 and 90 degrees; and a depression angle in the photographic direction to a road surface is between 10 and 30 degrees, wherein the first angle and depression angle causes the extracted contour shape to include one or more humped shapes corresponding to the at least one person currently riding the two-wheel vehicle.

16. The non-transitory computer readable recording medium according to claim 15, wherein the program causes the computer to further perform:

specifying a vehicle body unit of the two-wheel vehicle from the image by using a vehicle body detection dictionary; and specifying a riding state frame in an upper portion of the vehicle body unit.

17. The non-transitory computer readable recording medium according to claim 16, wherein the program causes the computer to further perform:

specifying a range of the vehicle body unit, the range in which a length between a front end on a lateral side of a front wheel and a rear end on a lateral side of a rear wheel of the two-wheel vehicle is set as a horizontal width and a length in a longitudinal direction of the front or rear wheel is set as a vertical height, or the range in which a length that is larger than a width between the front end on an upper side and the rear wheel of the two-wheel vehicle is set as the horizontal width.

18. The non-transitory computer readable recording medium according to claim 17, wherein
a head of each of the at least one person currently riding the two-wheel vehicle is specified from a shape of a contour of a valley portion in the upper portion of the vehicle body unit.

19. The non-transitory computer readable recording medium according to claim 18, wherein the at least one person currently riding the two-wheel vehicle comprises a first person and a second person, and
the valley portion is formed by a line from the head and a back of the person of the at least one person currently riding on a front seat of the two-wheel vehicle up to arms, a chest, and the head of the second person currently riding on a rear seat of the two-wheel vehicle.

20. The non-transitory computer readable recording medium according to claim 15, wherein the at least two persons previously riding the two-wheel vehicle includes three persons, the at least two humped shapes include three humped shapes corresponding to heads of the three persons, the shape stored in the database includes a contour of the three humped shapes, the program causes the computer to further perform:
determining the number of persons who ride on the two-wheel vehicle is three using the database.

21. The non-transitory computer readable recording medium according to claim 15, wherein the program causes the computer to further perform:
specifying a region for a vehicle body unit of the two-wheel vehicle from the image; and
specifying the upper portion based on the region for vehicle body unit the target region from the image.

22. A two-wheel vehicle riding person number determination system comprising:
an imaging device imaging a two-wheel vehicle that travels on a road;
a dictionary including a database of information specifying features of shapes of valley portions between humped shapes corresponding to heads of persons previously riding the two-wheel vehicle, wherein the features of the shapes of the valley portions are each formed by a line including the head and a back of a first person of the persons previously riding on a front seat of the two-wheel vehicle and arms, a chest, and the head of a second person previously riding on a rear seat of the two-wheel vehicle, and features of humped shapes of the heads of the persons, wherein the database specifies further features of shapes including at least two humped shapes and at least two valley shapes;
at least one memory storing instructions; and
at least one processor configured to execute the instructions to:
process an image obtained by the imaging device;
extract a whole contour shape of target region from the image, the target region indicating the two-wheel vehicle and at least one person currently riding the two-wheel vehicle;
extract an upper portion of the whole contour shape;
detect a humped shape corresponding to a head of each person of the at least one person currently riding on the two-wheel vehicle from shapes of valley portions in the extracted upper portion of the whole contour shape, using the database specifying the features of the shapes of the valley portions between the humped shapes corresponding to the heads of the persons previously riding the two-wheel vehicle; and
determine, on a basis of the upper portion of the whole contour shape, a number of persons currently riding on the two-wheel vehicle by determining a state formed by at least two persons previously riding the two-wheel vehicle using the database,
wherein the imaging device is installed in a range in which: a first angle formed by a traveling direction in the road and a photographic direction is limited to a range between 60 and 90 degrees; and a depression angle in a photographic direction to a road surface is between 10 and 30 degrees, the first angle and depression angle causing the extracted contour shape to include one or more humped shapes corresponding to the at least one persons currently riding the two-wheel vehicle.

* * * * *